March 16, 1948.  H. DRETTMANN  2,437,808
LOADING DEVICE
Filed Sept. 15, 1945  2 Sheets-Sheet 1
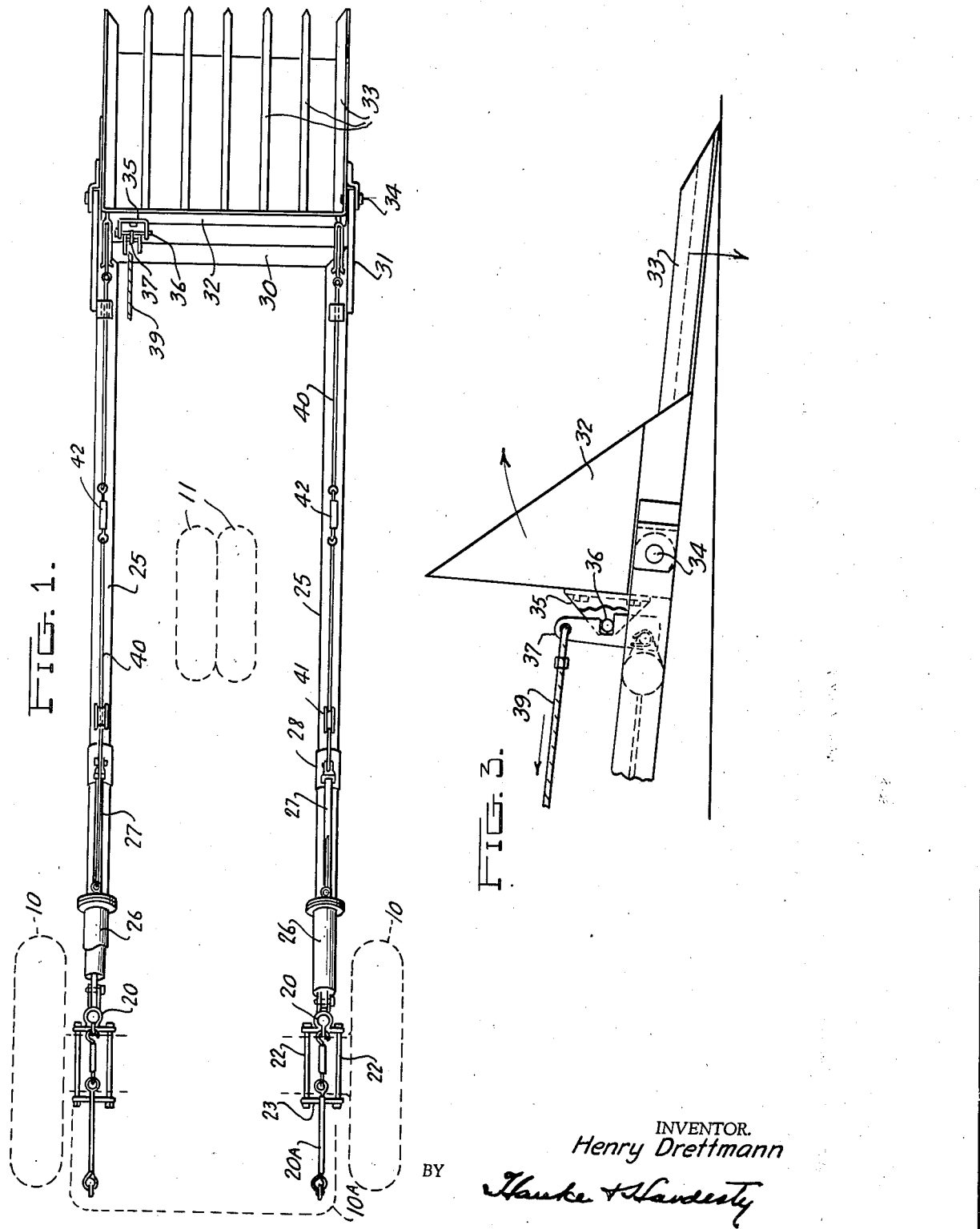
INVENTOR.
Henry Drettmann
BY

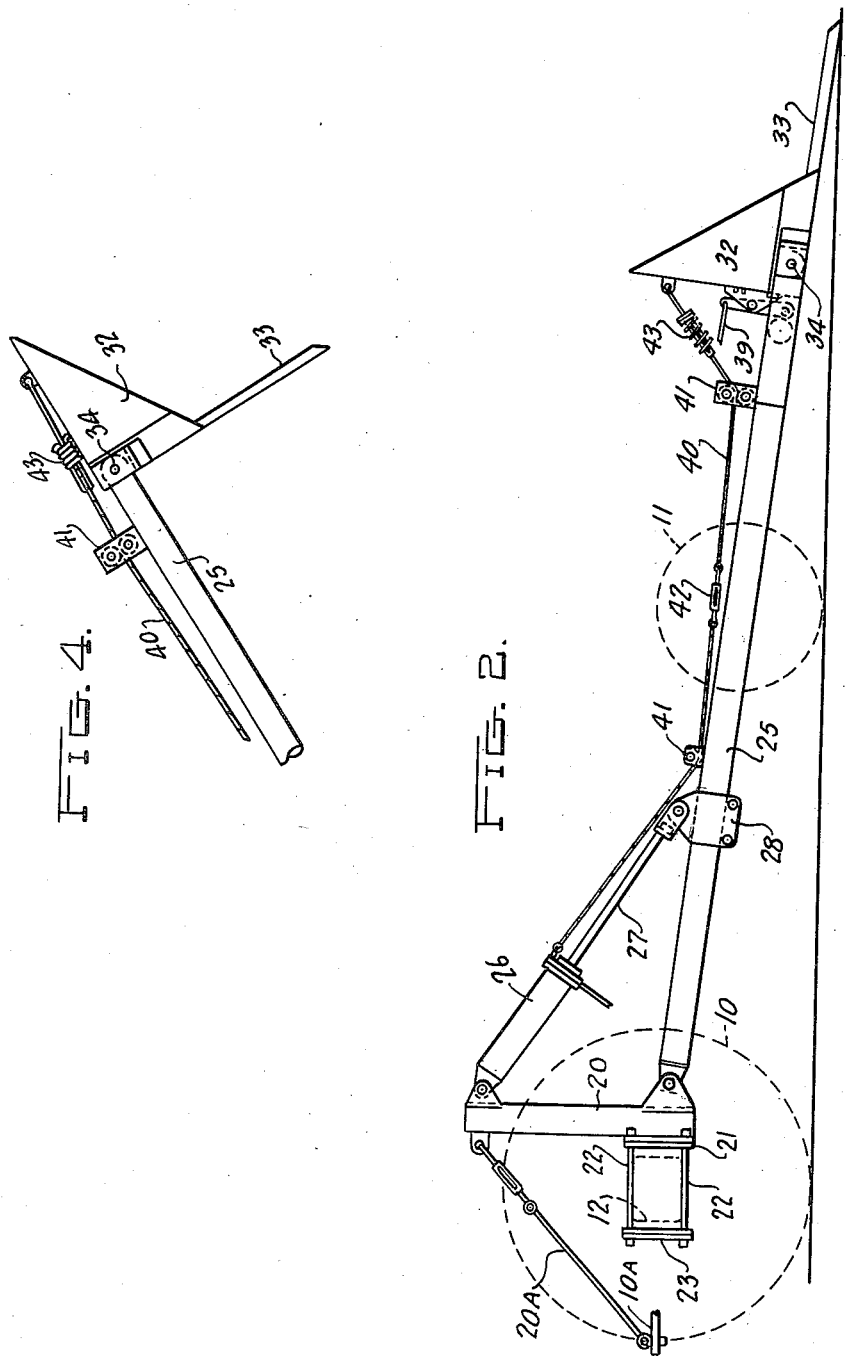

Patented Mar. 16, 1948

2,437,808

UNITED STATES PATENT OFFICE 2,437,808

LOADING DEVICE

Henry Drettmann, Detroit, Mich.

Application September 15, 1945, Serial No. 616,528

2 Claims. (Cl. 214—140)

The present invention relates to power loading devices for such materials as manure, gravel, or other loose substances, and specifically to a device attachable to a standard tractor and operable by the power supplied thereby.

Among the objects of the invention is a device of the kind indicated which will be capable of being quickly and easily attached to or detached from a standard tractor without alteration of the latter.

Another object is a power loader in which, in its elevated position, the weight is largely taken upon the rear or driving wheels, thereby facilitating movement of the tractor due to less interference with steering.

Another object is a power loader having a tilting material-carrier which will automatically right itself after dumping its contained load.

Another object is a device of the kind indicated which carries as a part of itself the operating pressure cylinders.

Still other objects and advantages will readily occur to those skilled in the art upon reference to the following description and the accompanying drawings in which Fig. 1 is a plan view of the device.

Fig. 2 is a side elevation of the same.

Fig. 3 is a side elevation of the scoop or fork and as in Fig. 2 on an enlarged scale.

Fig. 4 is a side view of the latter in its material release or dumping position.

In the drawings, the device is shown as adapted to be attached to the rear axle of a standard farm tractor indicated by the dotted line positions of the rear wheels 10 and front wheels 11 and the rectangular axle housing 12.

The loader itself consists of a pair of short tubular standards 20 provided at their lower ends with pads 21 adapted to fit against the front face of the axle housing 12 and clamped tightly by means of a plurality of bolts 22 and rear pads 23. These uprights or standards 20 are preferably stayed by extending stay wires 20A from their upper ends to a rearwardly extending portion of the tractor indicated at 10A, and have tubular arms 25 extending forwardly to well in front of the front tractor wheels 11. The standards 20 also have hinged to their upper ends cylinders 26 in which are pistons connected to the piston rods 27 whose outer ends are hinged to collars 28 fixed in adjusted position on the arms 25.

At their forward ends the arms 25 are fixed to a suitable tubular cross member 30, to thereby form bifurcated beam, and each is provided with an extension 31 projecting beyond the member 30 and serving as a support for the material handling element 32 illustrated in the drawing as provided with a plurality of forwardly extending sharpened fingers or tines 33, and intended specifically for the lifting and loading of materials such as manure, hay, or the like.

The element 32 is pivoted to the extensions 31 as by means of the bolts or pins 34 and has fixed to a rearward surface a clevis 35 of which the clevis pin 36 is adapted to coact with a suitable notch in a latch 37 pivoted on cross member 38 and spring pressed toward the clevis by a suitable spring. By means of the latch 37 and clevis 35, the element 32 is held in the position of Figs. 2 and 3, but may be allowed to swing downwardly to the position of Fig. 4 when the latch is drawn backwardly by means of a suitable rope or cable 39 attached to the latch and accessible to the operator.

Also fixed to the element 32 near its uppermost portion are cables 40 extending through suitable guide pulleys 41 along the arms 25 to attachment to cylinders 26, one of said pulleys being located adjacent the collar 28 and the other adjacent the free end of the arm 25.

These cables 40 are adjustable in length by turnbuckles 42 and each is provided with a shock absorbing link 43, shown as consisting of a compression spring acting between two sliding hook members of conventional construction.

In the operation of the device, in the position of Fig. 2, it may be thrust forward by the tractor to force the forks 33 under a pile of material and then by supplying fluid under pressure to the cylinder 26 in front of the piston therein, the latter is forced backward and of course raises the arms 25.

The source of said fluid under pressure is preferably a suitable pump (not shown) actuated by the tractor motor.

When the scoop element 32 is in its elevated position, it may be shifted, by moving the tractor, to a position over another vehicle or over a desired other location, and dumped by pulling the cord or rope 39.

In the elevated position, the cable 40 is of course slack until the dumping operation. However, when the arms 25 again descend, the slack is taken up and the scope element 32 is automatically returned to latched or operative position. By the use of this cable 40, it is possible to place the pivots 34 much nearer the rear end of the scoop element 32 and thereby ensure dumping when the latch is released.

While the scoop element 32 is shown as designed for manure or other fibrous material, it is obvious that suitable scoops for granular or other material may be substituted therefor. It should also be understood that instead of tubular members, the various elements may be made of materials having other structural shapes.

I claim:

1. A power loader accessory device for tractors comprising a pair of standards adapted to be fixed to the rear axle of a tractor adjacent the wheels thereof, a pair of arms hinged to said standards near the lower end thereof and extending forward to in front of said tractor, a material handling element pivotally mounted at the forward ends of said arms, a pair of cylinders hinged to said standards above said arms and provided with pistons and piston rods connected to said arms at points spaced from the hinges thereof, latch means normally preventing the pivotal movement of said material handling element but releasable to permit such pivotal movement and thereby to dump contained material, means whereby fluid under pressure may be supplied to said cylinders to draw said rods into said cylinders to thereby lift said arms, and means for automatically restoring said material handling element to latched position when said arms are lowered.

2. A power loader attachment for farm tractors consisting of a frame member made up of tubular elements in the form of a bifurcated beam, a material handling element or scoop pivoted to the closed end of said beam, a short tubular element hinged at one end to the end each of the legs of said beam, a cylinder piston and piston rod hinged to the other end of the short element and to the said leg and clamping means on said short elements whereby to fix said assembly to the ends of the rear axle housing of said tractor.

HENRY DRETTMANN.

REFERENCES CITED

The following references are of record in the file of this patent:

UNITED STATES PATENTS

| Number | Name | Date |
| --- | --- | --- |
| 1,703,275 | Lessmann | Feb. 26, 1929 |
| 2,001,803 | Stephens | May 21, 1935 |
| 2,296,827 | Anderson et al. | Sept. 29, 1942 |
| 2,304,075 | Davidson et al. | Dec. 8, 1942 |
| 2,339,518 | Reisser | Jan. 18, 1944 |
| 2,351,104 | Carter | June 13, 1944 |
| 2,393,435 | Wachter | Jan. 22, 1946 |
| 2,397,303 | Vowless | Mar. 26, 1946 |
| 2,398,964 | Rogers et al. | Apr. 23, 1946 |
| 2,419,493 | Hoff | Apr. 22, 1947 |